(12) United States Patent
Ruhlen et al.

(10) Patent No.: US 6,665,824 B1
(45) Date of Patent: Dec. 16, 2003

(54) SYSTEM AND METHOD FOR HANDLING A FAILURE REPORTING CONVERSATION

(75) Inventors: Matthew J. Ruhlen, Redmond, WA (US); Kirk A. Glerum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/570,825

(22) Filed: May 15, 2000

(51) Int. Cl.[7] .................................................. H02H 3/05
(52) U.S. Cl. ........................................... 714/57; 714/38
(58) Field of Search ............................... 714/57, 4, 38; 717/124, 126, 127, 174

(56) References Cited

U.S. PATENT DOCUMENTS

| | | | | |
|---|---|---|---|---|
| 5,237,677 A | * | 8/1993 | Hirosawa et al. | 714/57 |
| 5,522,036 A | * | 5/1996 | Shapiro | 714/38 |
| 5,812,748 A | * | 9/1998 | Ohran et al. | 714/4 |
| 6,122,754 A | * | 9/2000 | Litwin et al. | 714/4 |
| 6,378,087 B1 | * | 4/2002 | Flanagan et al. | 714/38 |
| 6,438,749 B1 | * | 8/2002 | Chamberlain | 717/174 |

* cited by examiner

Primary Examiner—Dieu-Minh Le
(74) Attorney, Agent, or Firm—Merchant & Gould

(57) ABSTRACT

The invention is a software module configured for handling failure information from a large base of clients. The invention is configured for a four-stage network conversation between a client and a server. In the first stage, the module collects failure information and creates a string address. The string address is sent to the server, where the string address is compared to predefined string addresses. In the second stage, the client creates a record query with the failure information for the server. The record query is sent to the server and compared to predefined failure records. In the third stage, the client transfers additional failure information to the server, and the server acknowledges information transfer. In the fourth stage, the client sends a confirmation message to the server. When necessary, a predefined string address corresponding to the particular failure information is created on the server for subsequent reference by a stage one network conversation.

19 Claims, 5 Drawing Sheets

SYSTEM AND METHOD FOR HANDLING A FAILURE REPORTING CONVERSATION

TECHNICAL FIELD

This invention relates generally to the field of software and, more particularly, to gathering and receiving a large number of failure reports about an application program module from a large number of users, and even more particularly, to a conversation between the user's computer and a repository for reporting the failures.

BACKGROUND OF THE INVENTION

When a computer program is being developed, developers sometimes find errors in the computer program. Errors, commonly referred to as "bugs", can cause a computer executing the computer program to fail or "crash". If a computer program is publicly released with one or more errors, the time and costs associated with fixing the errors or "bugs" after release is extremely expensive. In order to fix these errors, developers must locate. the errors. In early stages of development, developers may want to prioritize the work in fixing the errors. Therefore, a frequency count can be made of the errors to track the number of times a particular error is encountered. There is a need for a system and method to track and count errors in a computer program while the program is being developed.

Generally, when a computer program is publicly released, users experience a high rate of problems during the first few weeks after public release. In many cases, users will contact the program manufacturer for technical assistance in resolving the problem. During this time, the program manufacturer experiences numerous user technical assistance queries. Technical assistance queries are very expensive and time consuming for users and for the program manufacturer.

Client-server networks can handle user queries for information as an alternative to technical assistance personnel. Typically, a server connects to one or more clients. One or more users interact with the clients to exchange queries for information. The server executes a computer program such as a database to handle consumers' queries for information. When one or more clients contact the server for information, a query for each client is processed by the computer program executing on the server. However, this type of query processing is also very time consuming and expensive.

When a large number of clients query the server for information, the server may become overloaded when too many queries are requested of the server. Server operation may become extremely slow or sometimes the server may "crash" due to sheer number of queries. Slow server operation and downtime for the server becomes extremely time consuming, expensive, and very frustrating for users.

Thus, there is a need in the art for an improved method and system for handling the location of errors or "bugs" in a computer program during program development.

There is a further need for an improved method and system for handling technical assistance queries from a large number of users after program release.

There is yet a further need for an improved method and system for handling error queries from a large number of clients.

SUMMARY OF THE INVENTION

The present invention meets the needs described above in a system and method for handling reporting of failures of a computer program. The present invention is able to quickly and efficiently handle reporting of failures from a large number of users.

A preferred embodiment of the present invention is included in the "OFFICE" suite of application program modules, also manufactured, distributed, and sold by Microsoft Corporation. The invention can also be used in conjunction with the "INTERNET EXPLORER" web browser application program module, manufactured, distributed, and sold by Microsoft Corporation of Redmond, Wash. When a program module experiences a failure, failure information is reported to a repository by a failure reporting executable.

A failure may be a crash of the program module or a set-up failure during installation of the program module. Additionally, the failure may be a problem encountered during in-house testing of the program module. Once detected, program failures may be reported directly to a repository, such as a server operated by the manufacturer of the program that failed. The repository may also be a local file server operated by the corporation. For example, the corporate file server repository may be used to store the failures encountered by users in a corporate environment until these failures may be reported to the software manufacturer's server.

The present invention provides a network conversation between a failure reporting executable and a server that permits the handling of a large number of failure reports quickly and efficiently. In one stage of the network conversation, a relatively lightweight communication is used to rapidly determine whether a particular failure has been previously encountered. If a particular failure has been previously encountered, the server returns information relating to the particular failure, otherwise the next stage of the network conversation is initiated. In the next stage of the network conversation, a more complex communication is used to determine whether a particular failure has been encountered and what action should be taken. Typically, a request for additional failure information is sent from the server to the failure reporting executable. During the next stage of the network conversation, the additional failure information is collected by the failure reporting executable and sent to the server. In the last stage of the network conversation, the failure reporting executable informs the server that the information has been sent.

More particularly described, when program failures are reported to the repository, a four stage network conversation is implemented to handle the expected scale and volume of failure reports. In stage one, a failure reporting executable creates a static HTML string address with failure information. The failure reporting executable determines whether the string address matches a predefined string address at the repository. In response to determining that the string address matches a predefined string address at the repository, the repository sends file content (located at the matching string address) to the failure reporting executable. If no matching string address is found, stage two of the network conversation is initiated.

Stage two of the network conversation begins when the failure reporting executable creates an active server page (ASP) record query with failure information. The failure reporting executable accesses the repository to search a set of predefined failure records, such as SQL server records, and the repository determines whether the record query matches a predefined failure record. In response to determining that the record query does not match a predefined failure record, the repository starts a preset counter for tracking needed additional failure information requests. The repository then creates a failure record with failure information corresponding to the record query, and sends a request for additional failure information to the failure reporting executable.

In response to determining that the record query matches a failure record, the repository determines whether the preset counter is greater than zero. In response to determining that the preset counter is greater than zero, the repository sends a request for additional failure information to the application program module. Stage two of the network conversation ends when the request for additional failure information is sent to the failure reporting executable. Stage three of the network conversation is initiated when the failure reporting executable sends the additional failure information to the repository. Stage four of the network conversation is initiated when the failure reporting executable informs the repository of the successful transfer of additional failure information from the failure reporting executable to the repository. The repository then decrements the preset counter, and determines whether the preset counter is greater than zero. In response to determining the preset counter is zero, the repository creates a static HTML string address corresponding to the record query. In response to determining that preset counter is greater than zero, the repository ends stage four of the network conversation.

That the invention accomplishes the advantages described above will become apparent from the following detailed description of the exemplary embodiments and the appended drawings and claims.

DETAILED DESCRIPTION OF EXEMPLARY EMBODIMENTS

Before explaining how the invention is implemented, it will be helpful to define several terms. The term "bug" as used herein and in the claims that follow means a problem or error in execution of a computer program. The term "crash" as used herein and in the claims that follow means a situation that interrupts execution of an application program. The term "failure" as used herein and in the claims the follow means an error, a bug, or other type of situation that interrupts execution of an application program. The term "bucket" as used herein and in the claims that follow means a predefined selection of information. For example, a "bucket" can include information that identifies each unique bug or error, such as a unique identification number, a module name, a version number, an instruction pointer (EIP), and a report count.

Exemplary Operating Environment

Figure 1:
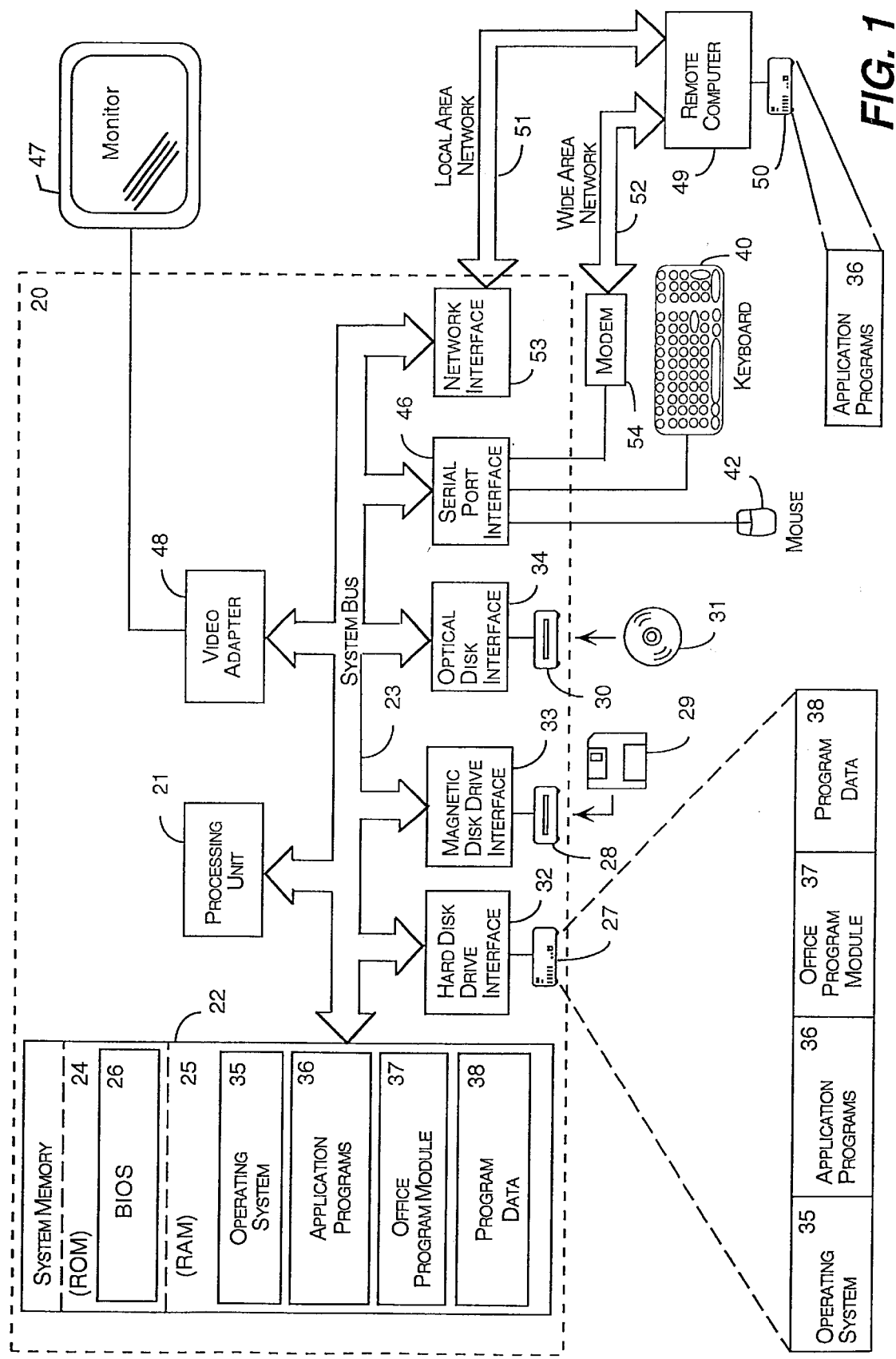
FIG. 1 is a functional block diagram of a personal computer system that provides the operating environment for the exemplary embodiments of the invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, program data 38, and other application programs 39.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into the "OFFICE" web browser application program manufactured and sold by Microsoft Corporation of Redmond, Wash., for use with personal computer systems such as the illustrative personal computer 20. The invention may be deployed within, or in connection with, the "OFFICE" suite of application programs including, among others, a "WORD" electronic word processing program. It will be appreciated that the principles of the invention are not limited to Internet browser, word processing, electronic spreadsheets or other software programs, but could equivalently be applied to any computer-implemented system that involves the use of computer application programs.

Figure 2:
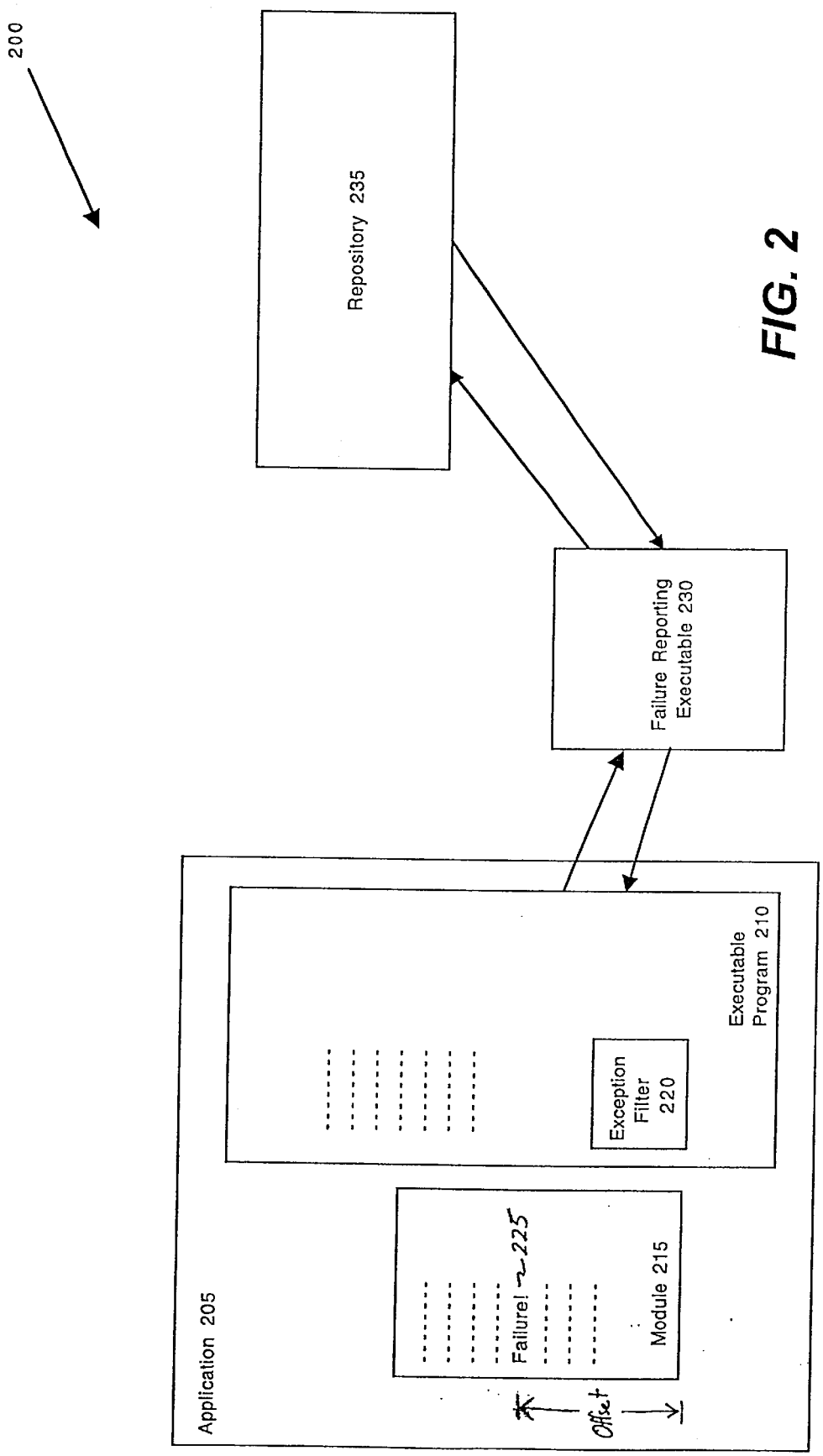
FIG. 2 shows a component block diagram of an exemplary system for handling a program failure.

FIG. 2 illustrates a component block diagram of an exemplary system 200 for handling failure information from a client in accordance with an embodiment of the present invention will be described. The system 200 can also be configured for handling a number of failures from a large user base. For a general discussion of gathering and reporting failures of application program modules, see "Method and System for Reporting a Program Failure", copending U.S. patent application Ser. No. 09/571,629, filed on May 17, 2000, commonly assigned and herein incorporated by reference.

The system 200 comprises an application program module 205. For example, application program module 205 may be the "WORD" word processor program module, marketed by Microsoft Corporation of Redmond, Wash. and included in the "OFFICE" 37 (FIG. 1) suite of program modules.

The system 200 further comprises an executable program 210 running inside of application program module 205. For example, in the "WORD" word processor program module, the executable program may be "WinWord.exe". An executable program is a program that can be run and typically means a compiled program translated into machine code in a format that can be loaded into memory and run by a computer's processor. The lines of code in executable program 210 are illustrated as dashed lines in FIG. 2.

The system 200 further comprises a module 215 being executed by the executable program 210 inside the application program module 205 at the time of the failure. For example, the module 215 may be a dynamic-link library such as "mso.dll". The lines of code in module 215 are illustrated as dashed lines in FIG. 2.

The system 200 also comprises an exception filter 220. Exception filters are well-known in the art and may be registered by program modules when the operating system 35 is started. When a failure (an exception) occurs, the exception filter 220 code is executed. For example, suppose a failure occurs while executable program 210 is executing instructions running module 215 at location 225. If executable program 210 has registered exception filter 220 with the operating system, then the exception filter 220 is executed when executable program 210 encounters an exception.

In the system 200, exception filter 220 executes a failure reporting executable 230. The failure reporting executable 230 is an executable program comprising all of the instructions needed to communicate between the application program module 205 and a repository 235. The communications between the failure reporting executable 230, the application program module 205 and the repository 235 are illustrated as arrows in FIG. 2. The failure reporting executable 230 is preferably separate from the application program module 205 because of the possible instability of the application program module (having experienced a failure).

The repository 235 is typically a remote server operated by the manufacturer or marketer of the application program module 205. For example, if the application program module is the "WORD" word processor program module, then the server may be operated by Microsoft Corporation of Redmond, Wash. If the repository 235 is a remote server, then the failure reporting executable 230 may communicate with it via conventional means, such as by using a web browser to connect to the server via the Internet. In one embodiment, the repository can be an IIS server running active server pages (ASP) and further connected to an SQL server. Those skilled in the art will be familiar with the capabilities and operations of an IIS server and an SQL server.

In some environments, such as the corporate environment, the repository 235 may be operated locally at the corporation. For example, a corporation may not allow their employees to have Internet access or a corporation may not want their employees reporting failures directly to an outside software manufacturer (potentially divulging sensitive corporate information). In those instances, the repository 235 may be a local server. If the repository is a local corporate repository, a system administrator at the corporation will typically be tasked with periodically uploading relevant information to the software manufacturer so that the software manufacturer may correct the failures being experienced by the corporation.

Having described the system 200 for handling a program failure in accordance with an embodiment of the present invention, an exemplary method 300 will be described in reference to FIG. 3.

Figure 3:
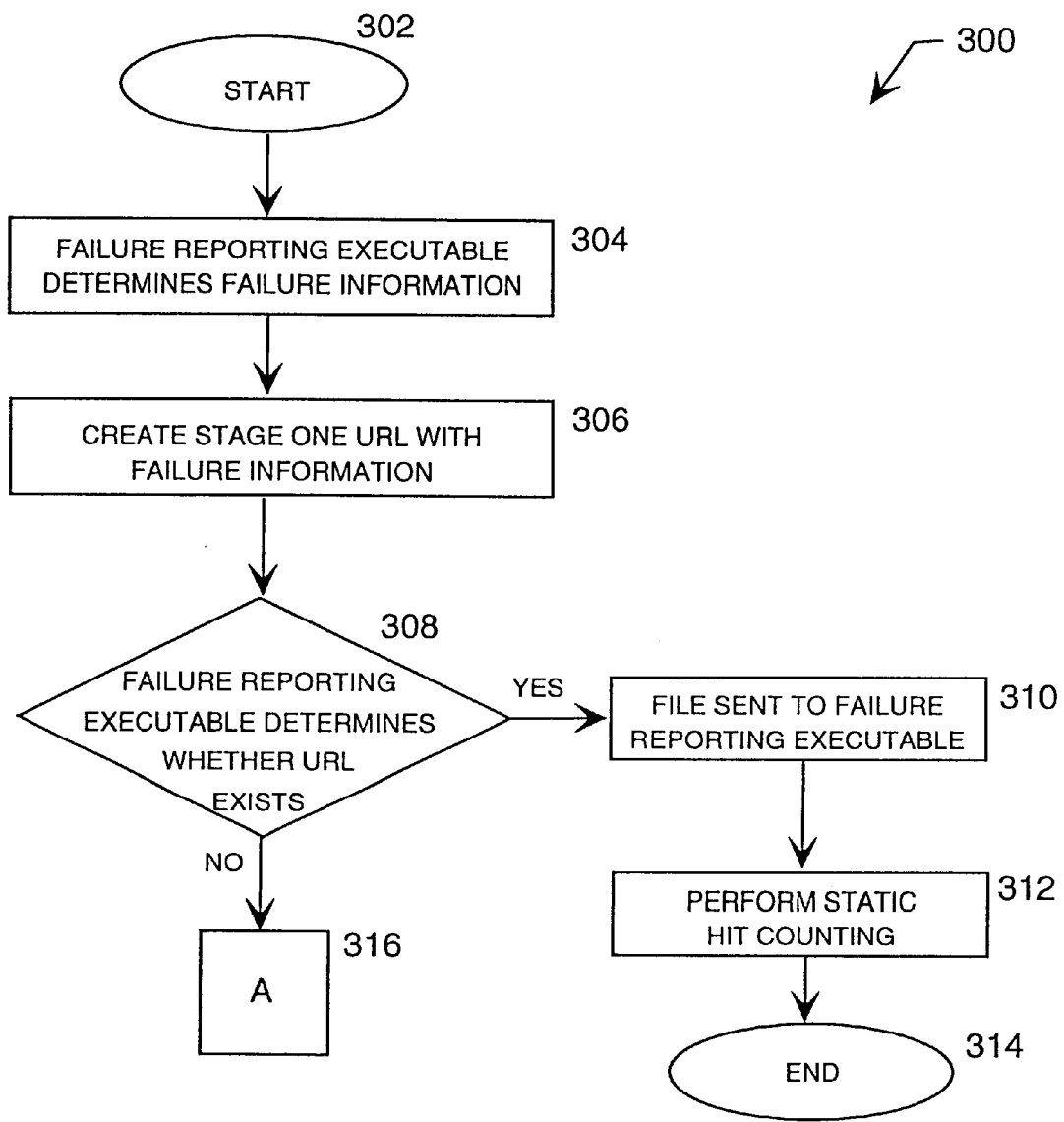
FIG. 3 is a logic flow diagram illustrating an exemplary method for stage one of a network conversation for handling failure reports.

FIG. 3 shows a logic flow diagram illustrating a routine 300 for stage one of a network conversation for handling one or more failure reports from a failure reporting executable 230 to a repository 235. In step 302, the routine 300 begins. Step 302 is followed by step 304, in which the failure reporting executable 230 receives failure information from an application 205. The application 205 utilizes conventional exception handling methods so that the failure reporting executable 230 receives failure information from the application 205. Failure information can include an application program name, an application version number, a module name, a module version number, and an offset into the module of the failing instruction's instruction pointer (EIP).

Step 304 is followed by step 306, in which the failure reporting executable 230 creates a stage one universal resource locator (URL) using the failure information. When the failure reporting executable 230 receives failure information, the failure reporting executable 230 creates a string address of a static hypertext markup language (HTML) file that includes the failure information for the type of failure being reported. For instance, if a program exception is being reported, the following static HTML URL might be constructed by the failure reporting executable 230:

http://officewatson.officeupdate.microsoft.com/Stage/One/winword.exe/10.0.2310.1/mso.dll/10.0.2312.1/0bcd1234.htm where failure information such as "winword.exe" designates an application program, "10.0.2310.1" designates the application program's version number, "mso.dll" designates a module, "10.0.2312.1" designates the module's version number, and "0bcd1234" designates an offset into the module of the failing instruction's instruction pointer (EIP). Other types of information identifying the failure can also be included in the static HTML URL.

Failure information entered into a string address format, such as a static hypertext markup language (HTML) file, is a relatively lightweight communication format that can be gathered and handled by the repository 235 in a relatively short amount of time. The string address format provides for rapid transmission and comparison of the failure information.

Step 306 is followed by decision block 308, in which the failure reporting executable 230 determines whether the stage one URL exists at the repository 235. Typically, the failure reporting executable 230 initiates execution of an associated communications application program 39, such as "INTERNET EXPLORER" web browser application program, to locate the URL at the repository 235. The failure reporting executable 230 connects to the repository 235, and determines whether the stage one URL exists at a specific directory of the repository 235. For example, the failure reporting executable 230 can initiate a Hypertext Transmission Protocol "GET" command of a static hypertext markup language (HTML) file in a particular directory of the repository 235 with the file name generated from the failure information. The failure reporting executable 230 sends the request to the repository 235 to attempt to collect the contents of the particular static HTML file at the repository 235. If the failure reporting executable 230 determines that a corresponding stage one URL exists, then the "YES" branch of decision block 308 is followed to step 310.

In step 310, the repository 235 sends a file to the failure reporting executable 230 corresponding to the particular failure information contained in the stage one URL. Typically, the repository 235 can respond to the failure information by providing the contents of the requested file, or otherwise directing the failure reporting executable 230 to a location where additional information can be found. For example, when the repository sends the contents of the requested file to the failure reporting executable 230, the repository also sends a message to the failure reporting executable 230 such as "thank you for your submission" providing feedback to a user that the failure information was received.

Step 310 is followed by step 312, in which "static hit counting" is performed by the repository 235. "Static hit counting" is a commonly known capability of an IIS server. Static hit counting provides a frequency count of stage one URL hits. Thus, someone monitoring the repository 235 can determine which failures are being experienced most frequently by users by checking the static hit counting. These frequently experienced failures may then be corrected by the software manufacturer.

It should also be understood that the main purposed of stage one is to quickly determine whether the repository 235 needs more information regarding a failure. If the URL exists at decision block 308, then the repository 235 does not need more information (such as when thousands of users have experienced and reported this failure previously). If the URL does not exist, then more information regarding the failure may be needed.

Step 312 is followed by end block 314, in which the routine 300 ends. Typically, when the file contents of a requested stage one URL are returned to the failure reporting executable 230, the network conversation is terminated and the routine 300 ends.

Referring back to decision block 308, if the failure reporting executable 320 determines that no matching stage one URL is present at the repository 235, then the "NO" branch is followed to block 316.

Figure 4:
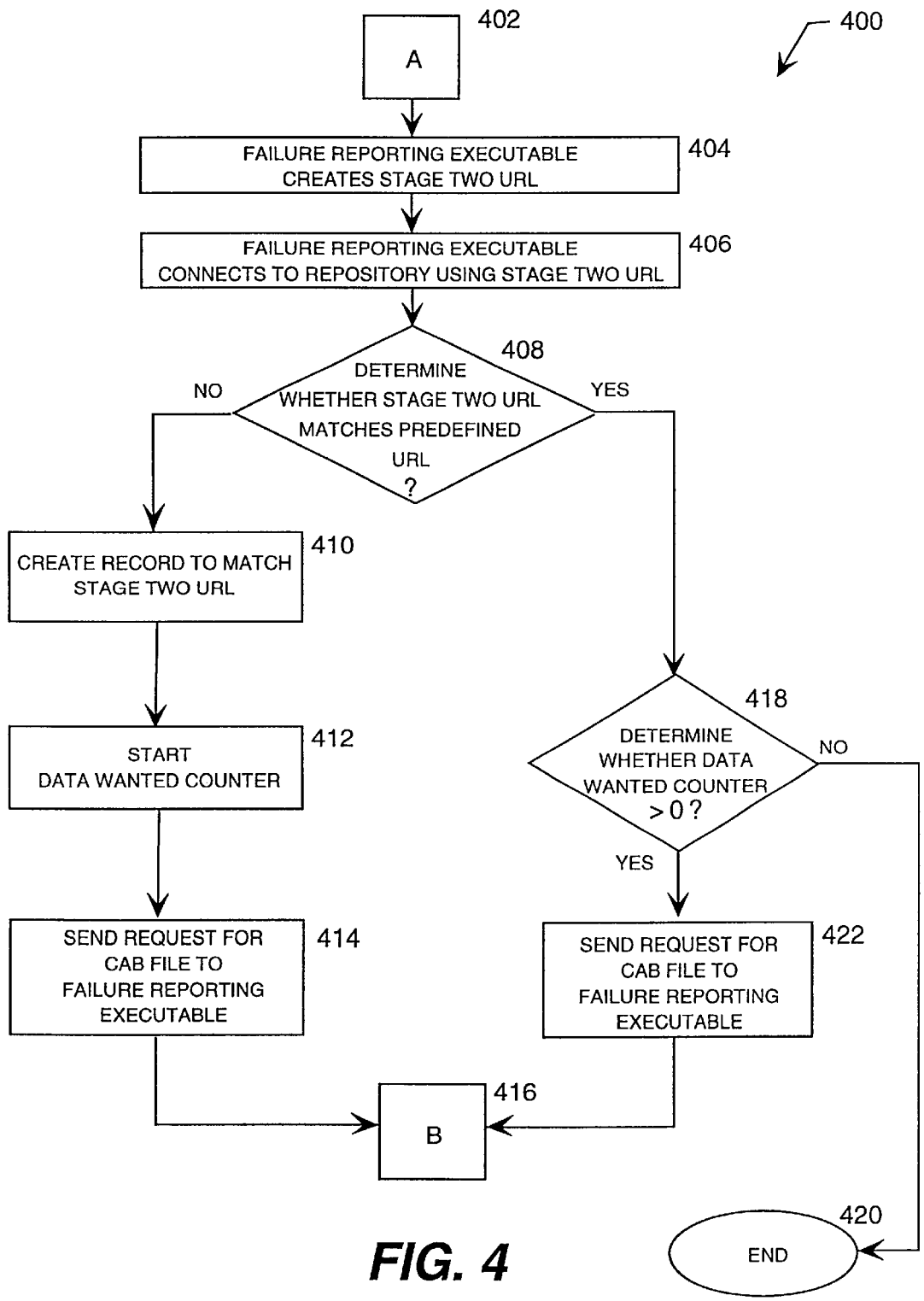
FIG. 4 is a logic flow diagram illustrating an exemplary method for stage two of a network conversation for handling failure reports.

Block 316 leads to stage two of the network conversation which is illustrated on FIG. 4 as routine 400.

FIG. 4 illustrates a logic flow diagram illustrating an exemplary method 400 for stage two of a network conversation for handling one or more failure reports from a failure reporting executable 230 to a repository 235. In block 402, the routine 400 continues from block 316 of FIG. 3.

Block 402 is followed by step 404 in which the failure reporting executable 320 creates a stage two URL using the failure information. Typically, the failure reporting executable 320 constructs a request string from the same failure used in the stage one URL, but instead of creating the URL of a static HTML page as in stage one of the network conversation, the failure reporting executable 320 creates a URL of an active server page (ASP) with the information provided as query string arguments to the URL. For example, the failure reporting executable 320 can construct a request string such as:

http://officewatson.officeupdate.microsoft.com/stagetwo.asp?AppName=winword.exe&AppVersion=10.0.2310.1&ModuleName=mso.dll&ModuleVersion=10.0.2312.1&Offset=0bcd1234

Step 404 is followed by step 406 in which the failure reporting executable 230 connects to the repository 235 using the stage two URL. Using the stage two URL, the failure reporting executable 320 requests the URL of an ASP on the repository 235 with the information provided as a query string arguments to the URL. Typically, the ASP page on the repository will be an ASP page on a server dedicated to handling stage two requests.

Step 406 is followed by decision block 408 in which the repository executes the ASP code specified by the URL to determine whether an SQL record exists to correspond with the error parameters specified in the stage two URL. Typically, the ASP will find SQL records for failures identified by particular failure information for failures that have been previously reported to the repository 235. If the ASP code finds no SQL records to match the error parameters of the stage two URL, then the "NO" branch is followed to step 410.

In step 410, the repository 235 creates a record to match the stage two URL. Typically, the repository 235 creates an ASP corresponding to the failure information of the stage two URL. The ASP is stored at the repository 235 for subsequent access or other stage two queries.

Step 410 is followed by step 412, in which a data wanted counter starts. The data wanted counter indicates the number of file downloads needed for a particular failure. Typically, the data wanted counter counts down from a predetermined number to zero. The data wanted counter can be a conventional counter associated with the repository.

Step 412 is followed by step 414, in which the repository 235 sends a request for a file to the failure reporting executable 230. The repository 235 requests this file to obtain more detailed failure information from the application 205. The requested file can be a cabinet (CAB) file. The CAB file may comprise a minidump, a registry query, a list of files to gather from the user's system, a list of file versions to gather from the user's system, a list of WMI Query Results to gather, a request for active documents in use by the application module at the time of the failure, or other information describing the failure of the application 205. For a set-up failure, the CAB file may also comprise set-up logs. In addition to a file request or request for additional failure information, the repository 235 also provides upload information to the failure reporting executable for completing stage three and four of the network conversation.

The upload information can include a URL to upload a file request to, a URL used to notify the server that the upload was successful, or any other information needed to complete stage three and stage four of the network conversation. By providing server information at this step, the system 200 gains flexibility by permitting one or more servers to handle failure reporting information uploads, and by permitting server architecture to be changed with minimal disruption of the system 200. For example, rather than hard-wiring the failure reporting executable 230 with upload information, the present invention, in one embodiment, provides this upload information to the failure reporting executable 230. The upload information may be changed at the repository 235, such as when certain servers are becoming overloaded.

Figure 5:
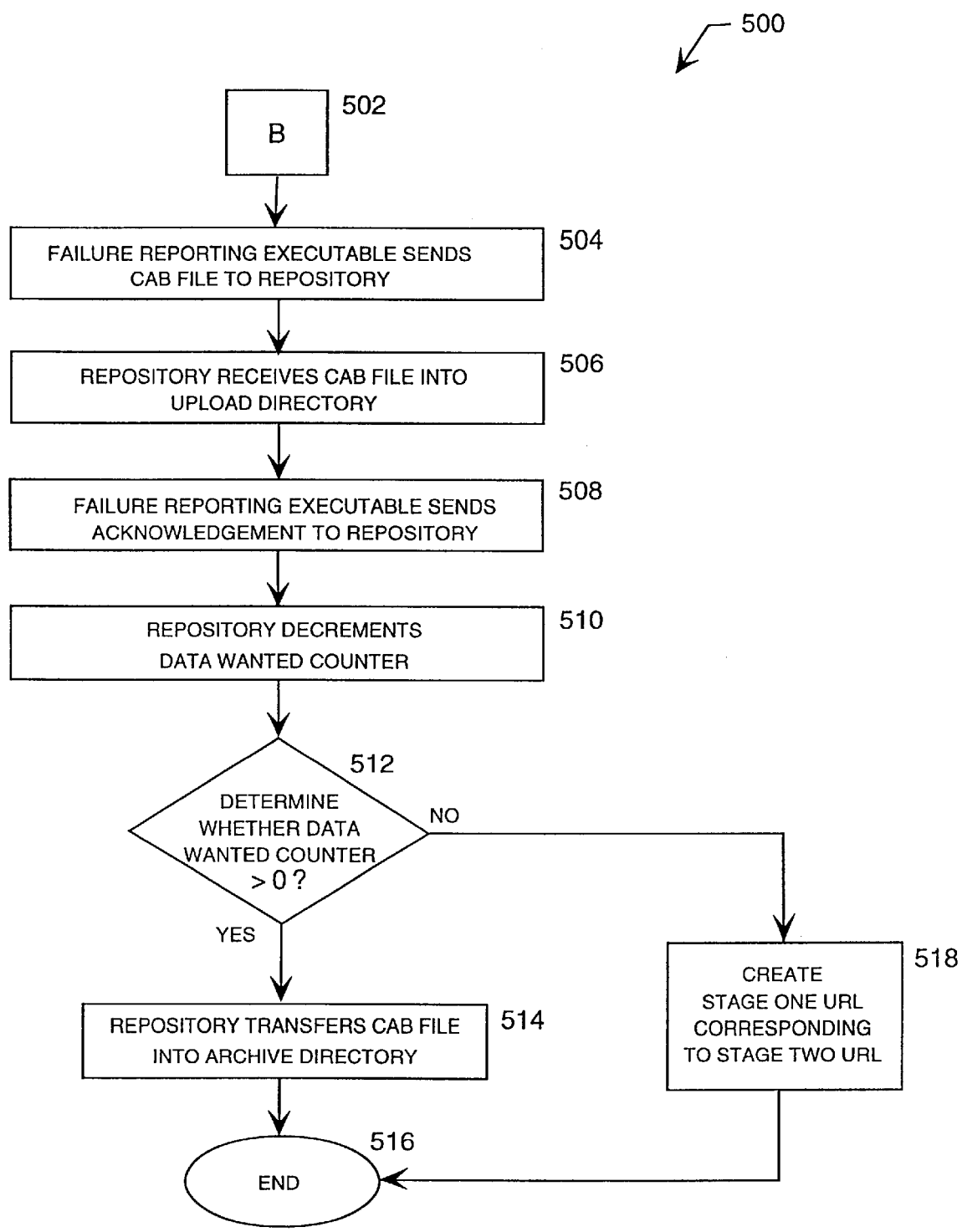
FIG. 5 is a logic flow diagram illustrating an exemplary method for stage three and stage four of a network conversation for handling failure reports.

Step 414 is followed by block 416, in which stage three of the failure handling routine begins as shown in FIG. 5.

Referring back to decision block 408, if an ASP (such as the one created at step 410) matches the stage two URL, then the "YES" branch is followed to decision block 418. In decision block 418, the repository 235 determines whether the data wanted counter for the failure entry is greater than zero. When the counter reaches zero, then no further file downloads are needed for a particular failure. However, if the counter is greater than zero then additional file downloads are still needed. If the counter is zero, then the "NO" branch is followed to the end block 420 where the routine 400 ends.

If the counter is greater than zero, then the "YES" branch is followed to step 422, in which the repository 235 sends a request for a file to the failure reporting executable 230. The repository 235 requests this file to obtain more detailed failure information from the application 205. A file can be a cabinet (CAB) file. The CAB file may comprise a minidump, a registry query, a list of files to gather from the user's system, a list of file versions to gather from the user's system, a list of WMI Query Results to gather, a request for active documents in use by the application module at the time of the failure, or other information describing the failure of the application 205. For a set-up failure, the CAB file may comprise set-up logs.

Step 422 is followed by block 416, in which stage three of the failure handling routine begins as shown in FIG. 5.

FIG. 5 illustrates a logic flow diagram illustrating an exemplary method 500 for stage three and stage four of a network conversation for handling one or more failure reports from a failure reporting executable 230 to a repository 235. In block 502, the routine 500 continues from block 416 of FIG. 4.

Block 502 is followed by step 504, in which the failure reporting executable 230 sends the requested CAB file to the repository 235. Typically, if the repository 235 determines that additional information regarding the failure is needed in stage two, then the failure reporting executable 230 receives a request for the CAB file containing this additional information from the repository 235 via the application program 39. In response to the request, the failure reporting executable 230 sends additional failure information to the repository 235 during stage three. The additional failure information can include a cabinet file containing all the requested data relating to a failure, problem, or error in execution of the application 205. The failure reporting executable 230 sends this cabinet file by a Hypertext Transfer Protocol "PUT" request to the URL provided by the repository 235 in the response of stage two. The cabinet file is provided in the body of the "PUT" request.

Step 504 is followed by step 506 in which the repository 235 receives the file from the failure reporting executable 230 into the specified upload directory. When the repository receives the file, the repository 235 acknowledges the successful completion of the "PUT" request by sending an appropriate message to the failure reporting executable 230.

Step 506 is followed by step 508, in which the failure reporting executable 230 informs the repository 235 of the successful transfer of additional failure information from the failure reporting executable 230 to the repository 235 using the URL provided in the response to stage two. Typically, the failure reporting executable 230 provides the repository 235 with a message containing the location of the file with the additional failure information. This message can serve as the acknowledgement from the failure reporting executable 230 to the repository 235 that the file has been successfully transferred.

Step 508 is followed by step 510, in which the repository decrements the data wanted counter for the failure entry. The data wanted counter is decremented by a single unit after acknowledgement of a successful file transfer is sent by the failure reporting executable 230 to the repository 235.

Step 510 is followed by decision block 512, in which the repository 235 determines whether the data wanted counter is greater than zero. If the counter is greater than zero, then the "YES" branch is followed to step 514. Typically, when the counter is greater than zero, then additional failure information for a particular failure is still needed by the repository 235, and subsequent file uploads to the repository 235 for a particular failure will be permitted.

In step 514, the repository 235 transfers the additional failure information file from the upload directory to an archive directory. This is a security measure to preserve data integrity.

Step 514 is followed by end block 516 in which the routine 500 ends.

Referring back to decision block 512, if the counter is zero, then the "NO" branch is followed to step 518. In step 518, the repository creates a corresponding stage one URL for the particular failure identified by the stage two URL. Typically, when the counter is zero, then no more additional failure information for a particular failure is needed by the system 200, and subsequent file uploads to the repository 235 for the particular failure will not be permitted. Thus, when another user encounters that failure and attempts to report the failure to the repository 235, the network conversation will end at stage one because at decision block 308, it will be determined that a stage one URL does exist. This provides a quick and efficient conversation between the repository 235 and the failure reporting executable 230.

Step 518 is followed by end block 516 in which the routine 500 ends.

It should be understood that the foregoing relates only to the exemplary embodiments of the present invention, and that numerous changes may be made therein without departing from the spirit and scope of the invention as defined by the following claims.

The invention claimed is:

1. A method for handling a failure in an application program module, the method comprising the steps:
   collecting failure information from the application program module;
   creating a string address with the failure information;
   determining whether the string address matches a predefined string address at a repository; and
   in response to determining that the string address matches a predefined string address at the repository,
      sending file content located at the matching string address from the repository to the application program module.

2. The method of claim 1, further comprising the steps:
   in response to determining that the string address does not match a predefined string at the repository,
      creating a record query with failure information;
      accessing the repository to search a set of predefined failure records; and
      determining whether the record query matches a predefined failure record.

3. The method of claim 2, further comprising the steps:
   in response to determining that the record query does not match a predefined failure record,
      starting a preset counter for tracking needed additional failure information requests;
      creating a failure record with failure information corresponding to the record query; and
      sending a request for additional failure information to the application program module.

4. The method of claim 3, further comprising the steps:
   in response to determining that the record query matches a failure record,
      determining whether the preset counter is greater than zero; and
   in response to determining that the preset counter is zero, sending a request for additional failure information to the application program module.

5. The method of claim 4, further comprising the steps:
   sending additional failure information from the application program module to the repository;
   decrementing the preset counter; and
   determining whether the preset counter is greater than zero.

6. The method of claim 5, further comprising the steps:
   in response to determining the preset counter is zero, creating a string address corresponding to the record query.

7. The method of claim 1 wherein the failure comprises a crash of the application module or a failure during set-up of the application program module.

8. The method of claim 1, wherein the failure information comprises an application program name, an application program version number, a module name, a module version number, and an instruction pointer (EIF).

9. The method of claim 1, wherein the repository comprises a remote server.

10. The method of claim 1, wherein the repository comprises an us server running ASP and further connected to a SQL server.

11. The method of claim 1, wherein the string address comprises a universal record locator for a static HTML page.

12. The method of claim 2, wherein the record query comprises a universal record locator for an active server page.

13. The method of claim 2, wherein the predefined failure records comprise active server pages.

14. The method of claim 3, wherein the failure record comprises an active server page.

15. The method of claim 3, wherein the additional error information comprises a cabinet file comprising a registry query, a list of other files to gather from the system, a list of file versions to gather from the system, a list of WMI Query Results to gather, a request for active documents in use by the application module at the time of the failure, other information describing a failure of the application, a minidump, or set-up logs.

16. A method for handling a failure in an application program module, the method comprising the steps:
   collecting failure information from the application program module;
   creating a string address with the failure information;
   determining whether the string address matches a predefined string address at a repository;
   in response to determining that the string address matches a predefined string address at the repository,
      sending file content located at the matching string address from the repository to the application program module;
   in response to determining that the string address does not match a predefined string at the repository,
      creating a record query with failure information;
      accessing the repository to search a set of predefined failure records;
      determining whether the record query matches a predefined failure record;
      in response to determining that the record query does not match a predefined failure record,
         starting a preset counter for tracking needed additional failure information requests;
         creating a failure record with failure information corresponding to the record query;
         sending a request for additional failure information to the application program module;
      in response to determining that the record query matches a failure record,
         determining whether the preset counter is greater than zero;
      in response to determining that the preset counter is zero,
         sending a request for additional failure information to the application program module;
         sending additional failure information from the application program module to the repository;
         decrementing the preset counter;
         determining whether the preset counter is greater than zero; and
         in response to determining the preset counter is zero, creating a string address corresponding to the record query.

17. A computer-readable medium having computer-executable instructions for handling the reporting of a failure in a computer program, the computer-executable instructions performing the steps of:

collecting failure information from the computer program:

creating a string address with the failure information;

determining whether the string address matches a predefined string address at a repository;

in response to determining that the string address matches a predefined string address at the repository, sending file content located at the matching string address from the repository to the computer program; and in response to determining that the string address does not match a predefined string at the repository, creating a record query with failure information;

accessing the repository to search a set of predefined failure records; and determining whether the record query matches a predefined failure record.

18. The computer-readable medium of claim 17 having further computer-executable instructions for performing the steps of:

in response to determining that the record query does not match a predefined failure record, starting a preset counter for tracking needed additional failure information requests;

creating a failure record with failure information corresponding to the record query; and sending a request for additional failure information to the computer program.

19. The computer-readable medium of claim 18 having further computer-executable instructions for performing the steps of:

in response to determining that the record query matches a failure record, determining whether the preset counter is greater than zero; and in response to determining that the preset counter is zero, sending a request for additional failure information to the computer program.

* * * * *

UNITED STATES PATENT AND TRADEMARK OFFICE
CERTIFICATE OF CORRECTION

PATENT NO. : 6,665,824 B1
DATED : December 16, 2003
INVENTOR(S) : Ruhlen et al.

It is certified that error appears in the above-identified patent and that said Letters Patent is hereby corrected as shown below:

Column 1,
Line 22, "locate. the errors." should read -- locate the errors. --

Column 3,
Lines 59-60, "claims the follow" should read -- claims that follow --

Signed and Sealed this

Sixth Day of July, 2004

JON W. DUDAS
*Acting Director of the United States Patent and Trademark Office*